(No Model.)

J. P. MOLITOR.
NOSE PAD FOR EYEGLASSES.

No. 411,164. Patented Sept. 17, 1889.

WITNESSES
M. T. Loefler.
J. A. Vaughan

INVENTOR
John P. Molitor
by Jno. T. Boone
his Attorney

UNITED STATES PATENT OFFICE.

JOHN P. MOLITOR, OF VALLEJO, CALIFORNIA.

NOSE-PAD FOR EYEGLASSES.

SPECIFICATION forming part of Letters Patent No. 411,164, dated September 17, 1889.

Application filed January 28, 1889. Serial No. 297,823. (No model.)

*To all whom it may concern:*

Be it known that I, JOHN P. MOLITOR, of Vallejo, county of Solano, State of California, have invented an Improved Cushion or Pad for Eyeglasses; and I do hereby declare that the following is a full, clear, and exact description thereof.

The object of my invention is to provide a soft yielding cushion or pad which can be connected with or attached to the clamping or pressure springs or bars of eyeglasses, so that the pressure on the bridge of the nose, by which the glasses are held in place, will not cause discoloration, callous, or stoppage of the nasal duct.

Figure 1:
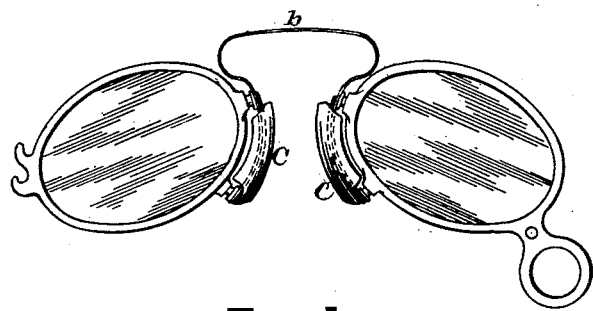
Figure 2:
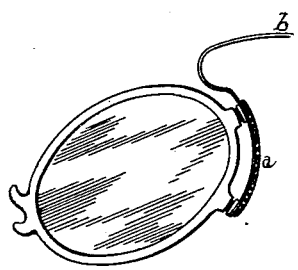
Figures 3, 4:
Figure 5:

Referring to the accompanying drawings, Figure 1 shows a pair of eyeglasses with my nose-cushions attached. Fig. 2 shows the ordinary nose-piece. Fig. 3 is a longitudinal section of the cushion. Fig. 4 is a cross-section, and Fig. 5 is a back view showing the slit.

Let $a$ represent the springs or clamping-bars of a pair of eyeglasses, by means of which and the spring $b$ the glasses are clamped or held upon the bridge of the nose. To prevent the springs or bars $a$ from injuriously affecting the bridge of the nose by their pressure, I provide for each of these springs or bars an elastic cushion or pad $c$, which can be attached to or secured upon the bars or springs in such a manner that they will protect the bridge of the nose and at the same time give a better grip for retaining the glasses in place.

These cushions or pads may be made as a separate article of manufacture and arranged to be clasped upon or removed from the springs or bars at will, or they may be made so as to be a permanent part of the spring or bar. I prefer the former style. This cushion or pad I make of soft rubber in the form of a short flat tube properly curved to fit the curve of the springs or bars. The hole which passes through the tube is flat, like the bar or spring on which the cushion is to be placed, and I slit the tube or cushion longitudinally on its back side, so that by opening the slit $i$ the tube or cushion can be placed upon the bar or spring without detaching either end of the bar or spring. The front or bearing side of the cushion I make somewhat flat with a longitudinal groove, channel, or depression $e$, which forms two cheeks, one on each side of the groove or depression for the purpose of gripping the bridge of the nose more firmly.

The bearing or outer sides of these cushions are soft enough to prevent indenting the nose and have a wide bearing-surface, so that a slight grip on the bridge of the nose will retain the glasses in position.

As above stated, the glasses might be manufactured with a soft-rubber cushion or tube permanently secured around the springs or bars; but I prefer the detachable cushions, as they can be made in quantity and sold as a separate article.

Having thus described my invention, what I claim, and desire to secure by Letters Patent, is—

1. A cushion-pad for the nose-bearings of eyeglasses, consisting of a soft-rubber tube $c$, having a longitudinal channel or depression $e$ in its bearing-face, substantially as described.

2. A detachable cushion-pad for the nose-bearings of eyeglasses, consisting of a soft-rubber tube $c$, having a slit $i$ along its back, so that it can be opened and clasped upon the bars or springs $b$, substantially as above described.

3. The cushion-pad $c$, for eyeglasses, made of soft rubber in the form of a tube and having a longitudinal slit $i$ on one side and a longitudinal groove or depression $e$ in its opposite or bearing side, substantially as described.

JOHN P. MOLITOR.

Witnesses:
M. G. LOEFLER,
J. E. HAMILL.